US009298964B2

(12) United States Patent
Li et al.

(10) Patent No.: US 9,298,964 B2
(45) Date of Patent: Mar. 29, 2016

(54) IMAGING TERMINAL, IMAGING SENSOR TO DETERMINE DOCUMENT ORIENTATION BASED ON BAR CODE ORIENTATION AND METHODS FOR OPERATING THE SAME

(75) Inventors: Jingquan Li, Auburn, NY (US); Robert M. Hussey, Waxhaw, NC (US); Timothy P. Meier, Camillus, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 859 days.

(21) Appl. No.: 12/751,493

(22) Filed: Mar. 31, 2010

(65) Prior Publication Data

US 2011/0240740 A1    Oct. 6, 2011

(51) Int. Cl.
 *G06K 7/14*     (2006.01)
 *G06K 9/20*     (2006.01)
 *G06K 9/32*     (2006.01)

(52) U.S. Cl.
 CPC ............ *G06K 7/1443* (2013.01); *G06K 7/1447* (2013.01); *G06K 7/1456* (2013.01); *G06K 9/2054* (2013.01); *G06K 9/32* (2013.01); *G06K 9/3208* (2013.01); *G06K 9/3283* (2013.01)

(58) Field of Classification Search
 CPC . G06K 7/1443; G06K 7/1417; G06K 7/1456; G06K 9/2054; G06K 9/3216; G06K 2009/3225; G06K 7/1447; G06K 9/32; G06K 9/3208; G06K 9/3283
 USPC .................................................... 235/462.15
 See application file for complete search history.

(56) References Cited

U.S. PATENT DOCUMENTS

| | | | |
|---|---|---|---|
| 4,588,211 A | 5/1986 | Greene | |
| 4,776,464 A | 10/1988 | Miller et al. | |
| 4,832,204 A | 5/1989 | Handy et al. | |
| 5,119,433 A | 6/1992 | Will | |
| 5,120,940 A | 6/1992 | Willsie | |
| 5,138,140 A | 8/1992 | Siemiatkowski et al. | |
| 5,199,084 A | 3/1993 | Kishi et al. | |
| 5,262,623 A | 11/1993 | Batterman et al. | |
| 5,307,423 A | 4/1994 | Gupta et al. | |
| 5,317,388 A | 5/1994 | Surka et al. | |
| 5,331,151 A | 7/1994 | Cochran et al. | |
| 5,410,141 A | 4/1995 | Koenck et al. | |
| 5,413,383 A | 5/1995 | Laurash et al. | |
| 5,414,251 A * | 5/1995 | Durbin | 235/462.2 |
| 5,428,212 A | 6/1995 | Tani et al. | |
| 5,471,533 A | 11/1995 | Wang et al. | |
| 5,490,217 A | 2/1996 | Wang et al. | |
| 5,500,516 A | 3/1996 | Durbin | |
| 5,506,697 A | 4/1996 | Li et al. | |
| 5,617,481 A | 4/1997 | Nakamura | |
| 5,659,167 A | 8/1997 | Wang et al. | |
| 5,857,029 A | 1/1999 | Patel | |
| 6,070,805 A * | 6/2000 | Kaufman et al. | 235/494 |
| 6,129,278 A | 10/2000 | Wang et al. | |
| 6,201,901 B1 * | 3/2001 | Zhou et al. | 382/306 |
| 6,390,362 B1 | 5/2002 | Martin | |
| 6,493,110 B1 | 12/2002 | Roberts | |
| 6,561,428 B2 | 5/2003 | Meier et al. | |

(Continued)

*Primary Examiner* — Christopher Stanford
(74) *Attorney, Agent, or Firm* — Additon, Higgins & Pendleton, P.A.

(57) ABSTRACT

Embodiments of an image reader and/or methods of operating an image reader can capture an image, identify a bar code or IBI form within the captured image, and, store or display the captured image responsive to the an orientation of the bar code.

22 Claims, 9 Drawing Sheets

(56) References Cited

U.S. PATENT DOCUMENTS

| | | |
|---|---|---|
| 6,722,569 B2 | 4/2004 | Ehrhart et al. |
| 6,834,807 B2 | 12/2004 | Ehrhart et al. |
| 7,222,789 B2 * | 5/2007 | Longacre et al. ............. 235/450 |
| 2001/0035458 A1 | 11/2001 | Schum et al. |
| 2002/0110283 A1 | 8/2002 | Fan et al. |
| 2002/0128796 A1 | 9/2002 | Matsutani |
| 2003/0034463 A1 | 2/2003 | Tullis |
| 2004/0108382 A1 | 6/2004 | Schum et al. |
| 2004/0155110 A1 | 8/2004 | Ehrhart et al. |
| 2005/0060059 A1 | 3/2005 | Klein et al. |
| 2005/0067496 A1 * | 3/2005 | Yen et al. ................. 235/462.08 |
| 2005/0167504 A1 * | 8/2005 | Meier et al. .............. 235/462.45 |
| 2006/0071081 A1 | 4/2006 | Wang |
| 2007/0077059 A1 | 4/2007 | Denoue et al. |
| 2009/0022429 A1 | 1/2009 | Longacre, Jr. et al. |
| 2010/0149187 A1 * | 6/2010 | Slavin et al. .................. 345/441 |

* cited by examiner

IMAGING TERMINAL, IMAGING SENSOR TO DETERMINE DOCUMENT ORIENTATION BASED ON BAR CODE ORIENTATION AND METHODS FOR OPERATING THE SAME

FIELD OF THE INVENTION

The application relates to data terminals in general and more specifically to image sensor based data terminals capable of obtaining decodable indicia and frames of image data.

BACKGROUND OF THE INVENTION

Image sensor based indicia reading terminals have been used for a number of years for purposes of decoding information encoded in bar code symbols. For decoding of a bar code symbol, images captured with use of an image sensor based terminal are subject to processing by application of one or more bar code decoding algorithms. Image sensor arrays are becoming available in forms having increasing numbers of pixels. Further, by using color image sensors in the Automatic Identification and Data Capture (AIDC) industry, high quality color images/videos can be captured and stored to meet the growing needs of scanner customers.

The availability of higher density image sensor arrays having an increased number of pixels, while providing certain advantages, can also present challenges. With image sensor arrays having increasing numbers of pixels, frames of image data captured with use of such terminals have increasing numbers of pixel values. While a greater number of pixel values generally mean an image representation with a higher resolution, the higher resolution can result in increased processing delays associated with locating of features represented within a frame. Processing the image representation with the higher resolution when capturing forms or documents with decodable indicia therein needs improved processing tools.

SUMMARY OF THE INVENTION

According to an aspect of the application, an indicia reading terminal having an image sensor pixel array incorporated therein can decode decodable indicia and provide frames of image data for storage, display, or transmission.

According to an aspect of the application, an indicia reading terminal having an image sensor pixel array incorporated therein can decode a decodable indicia and provide an orientation for frames of image data for storage, display, or transmission.

According to an aspect of the application, an indicia reading terminal having an image sensor pixel array incorporated therein can decode decodable indicia and provide an orientation for images of forms or documents within frames of image data for storage, display, or transmission using the decoded indicia.

An imaging terminal in one embodiment can operate to capture at least one barcode in a document image occupying less than a full frame and determine an orientation of the document image or frame for subsequent processing.

In one embodiment, an image reading terminal can include a two dimensional image sensor array extending along an image plane, said two dimensional image sensor array comprising a plurality of pixels; an optical assembly for use in focusing imaging light rays onto the plurality of pixels of said two dimensional image sensor array; a housing encapsulating said two dimensional image sensor array and said optical assembly; wherein the terminal is operative in an indicia decode mode in which the terminal, in response to an operator initiated command, captures a frame of image data and processes the frame of image data for attempting to decode a decodable indicia representation; wherein the terminal is operative in a picture taking mode in which the terminal, in response to an operator initiated command, captures at least one frame of image data for attempting to output an image; a memory capable of storing said frame of image data; and a control processor capable of cropping a received document image to a prescribed size in pixels or linear dimensions, and said control processor capable of storing or displaying the received document image or the cropped document image in a prescribed orientation responsive to an orientation of a barcode in the received document image.

In another embodiment, an indicia reading terminal method for processing a document image, can include receiving a document image disposed in a frame of image data; cropping the document image to a region of interest detected in the document image; correcting the document image for a spatial relationship between a document and the indicia reading terminal; aligning a two dimensional orientation of the document image to the two dimensional orientation of the frame of image data; determining an orientation of a barcode in a modified document image; storing or displaying the document image or the cropped document image in a prescribed viewing position responsive to an orientation of the barcode in the document image.

In yet another embodiment, a method of processing data from an indicia reading terminal including an image sensor array can include capturing an image of the document automatically cropping the image of the document to determine corner points of the document; decoding one or more bar codes printed on the document, where the decoding provides sequenced corners of a position of the bar code in the image of the document, and where the sequenced corners represents an orientation of the bar code in the image of the document; determining an orientation of the document according to the orientation of the bar code; formatting the image of the document so that a top of the image of the document represents a top of the document in a proper orientation; and displaying or saving the formatted image of the document.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION OF EXEMPLARY EMBODIMENTS

Embodiments according to this application include features of systems and methods for discriminating (e.g., automatically) between orientations of types of data and/or documents within images when using an indicia reading terminal such as an image reader. When using an embodiment of an image reader, a human operator may intuitively point the reader directly at the data to be collected, regardless of its type, and actuate a trigger. The data to be collected can be a target such as but not limited to a document or a form that can include a barcode (e.g., a 1D barcode, a 2D barcode, a 1D stacked barcode, or the like). However, such operations can provide a large variation in size and orientation of the data to be collected within a captured frame.

Figure 1:
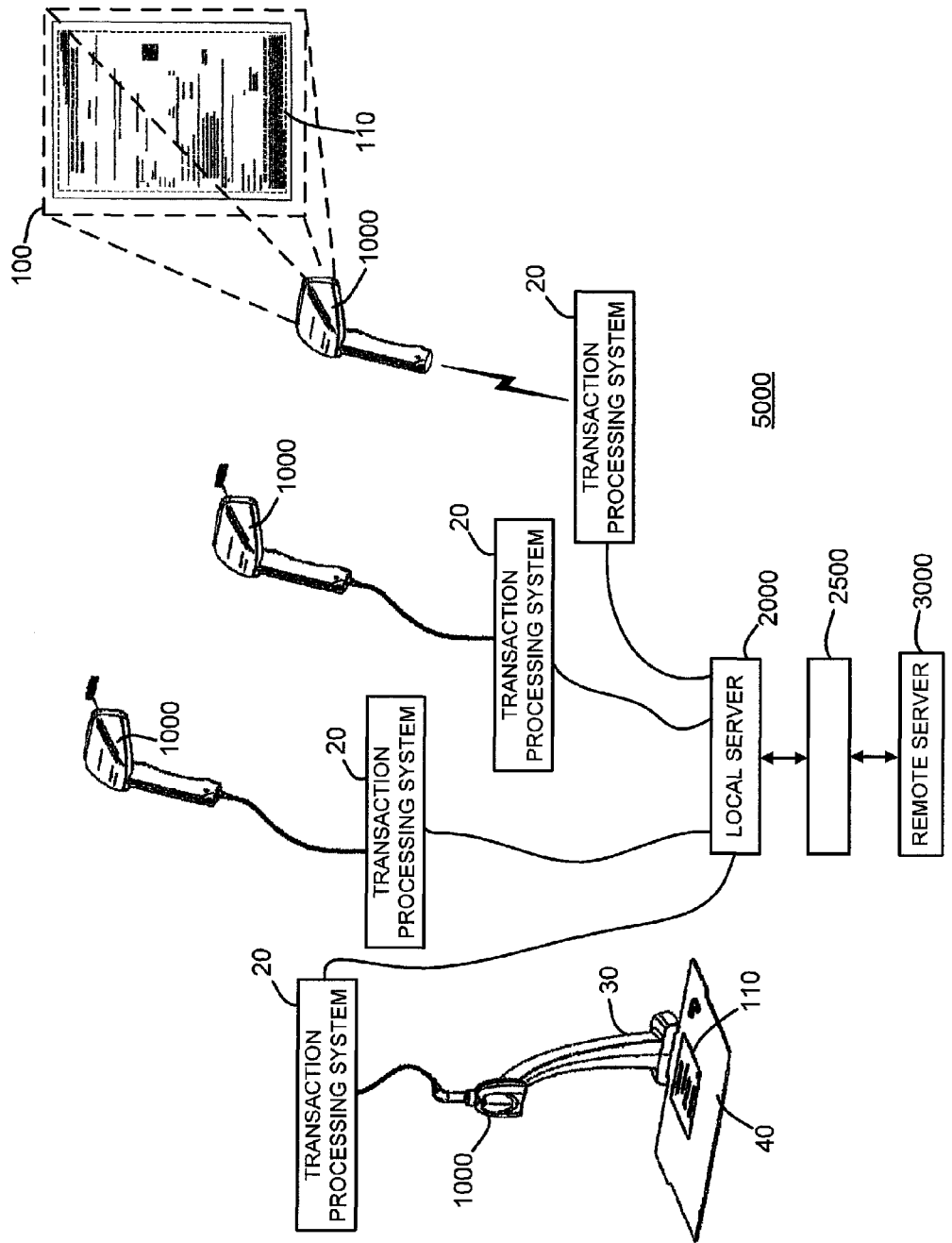
FIG. 1 is a schematic diagram illustrating an imaging system configuration capable of incorporating embodiments of the application.

FIG. 1 illustrates an imaging system configuration in accordance with embodiments of the present application, where a plurality of image readers or terminals 1000 are being operated or utilized in a facility, such as a retail store. An image reader has an imaging field of view 100 that can represent the entire image captured and digitized by an image sensor provided therein. The image readers may be in communication (wired or wireless) to a local transaction processing system 20, such as a cash register, point of transaction (POT) terminal, customer station or employee station. The transaction processing systems 20 may be in communication (wired or wireless) with a local server 2000 and/or a remote server 3000. In FIG. 1, the local server 2000 and the remote server 3000 can be coupled via a network 2500. An image reader 1000 may be placed on a stand 30 for viewing a document 110, that may be placed on a surface 40 (e.g., platen), oriented by a support, or held by the operator. Imaging system 5000 can be utilized for processing a frame of image data captured with the use of terminal 1000.

Figure 2:
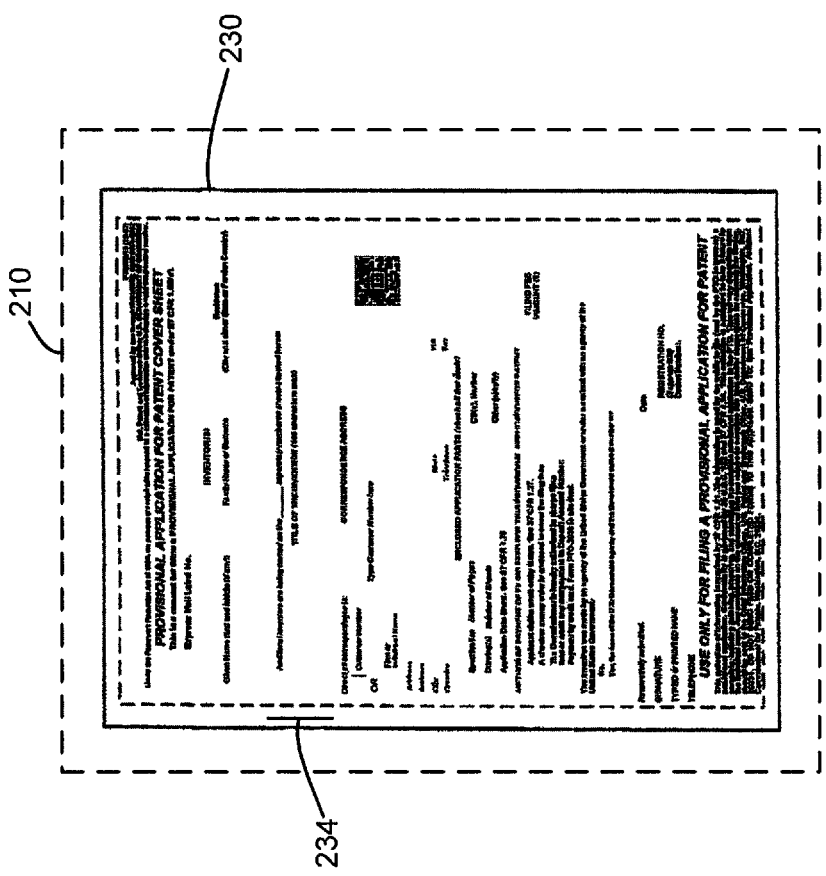
FIG. 2 is a diagram that shows an exemplary form or document.

FIG. 2 illustrates a form 230 with various types of data that may be processed, imaged, or automatically be collected by an image reader 1000. For example, the collection process can involve the human operator placing a form 230 in the field of view 210 of an image reader 1000. The operator may actuate a trigger on an image reader 1000 for any data type to be read or the reader 1000 may automatically image the target (e.g., document 230). The data shown may include typed text, a barcode, such as a two-dimensional barcode encoding a label number, a 1D barcode, a picture, a signature, handwritten text, etc.

In one embodiment, an image reader 1000 may be used as a document scanner and a barcode reader for use in exemplary operations, such as a pharmacy or other retail application, because the retail environment may desire to keep electronic records of documents or forms, such as but not limited to prescriptions. The image reader may be placed in the stand 30, and prescription documents may be placed under the image reader 1000, and images (e.g., image 310) of the prescription documents may be taken. Prescriptions and/or other forms and document may be on many different sizes of paper, which may result in different image file sizes, some or all of which may be undesirably large. For example, a large document may take up the entire field of view of the image reader, however, a very small document may only take up a small portion (e.g., less than 5%, 10%, 25%, 50%, 70% or 90%) of the image reader field of view. Compression can be used to reduce a size of an image file or data. Further, a bar code may occupy a small amount of the form 230 or the field of view 210 (e.g., less than 0.5%, 1%, 2%, or 5%).

In addition, it may not be desirable to retain an entire image 310 after a document or form 230 is imaged. In an exemplary embodiment, the size of an image may be reduced through an image handling process that can include image cropping process, an image orienting process, and/or an image distribution correction process. An exemplary image cropping process (e.g., automatic cropping process) can take an image, look at that image to determine a region or regions of interest, and crop the image so that the resulting image (e.g., cropped image) only includes the region(s) of interest. The unwanted portions of the image can be ignored, removed, or cropped out of the image.

An exemplary image transforming process can include aligning text or rows and columns of the document 330 with rows and columns of the frame of image data 310. Further, the image transforming process can re-size an image of a document while maintaining a two dimensional ratio (e.g., height to width ratio). In one embodiment, a new image (e.g., a transformed image) can be created by the image transforming process.

An exemplary image distortion correction process can include correction of angular distortion or incorrect rotational orientation caused by improper location of the image reader 1000 relative to the object being imaged by adjusting (e.g., modifying) the image electronically. For example, the image distortion correction process can adjust for an imaging system distortion such as the plane of the image reader 1000 not corresponding to the plane of the document being imaged (e.g., skew) or other filtering techniques that may help to make the resulting image more appealing. In one embodiment, the image distortion correction process can adjust for imaging system distortion caused when an imaging axis of the image reader 1000 is at a non-perpendicular orientation to the document or form being imaged. Further, the process can include lens or optical component correction (e.g., lens barrel correction, pincushion correction).

One exemplary image cropping process can make a determination of a document image within an image reader field of view 210 or resulting image can use a known template (e.g., pattern) on the surface 40 where a document or form 230 to be imaged is placed. The exemplary template may have a detectable or known pattern such as evenly spaced dots, or a grid of some type. In this exemplary method, placing a document 230 on the grid of the surface 40, breaks the pattern and can reveal where the document 230 is by locating the breaks in the pattern within the frame of image data 310. Other known or prescribed backgrounds can be used when obtaining the frame of image data 310.

Figure 3:
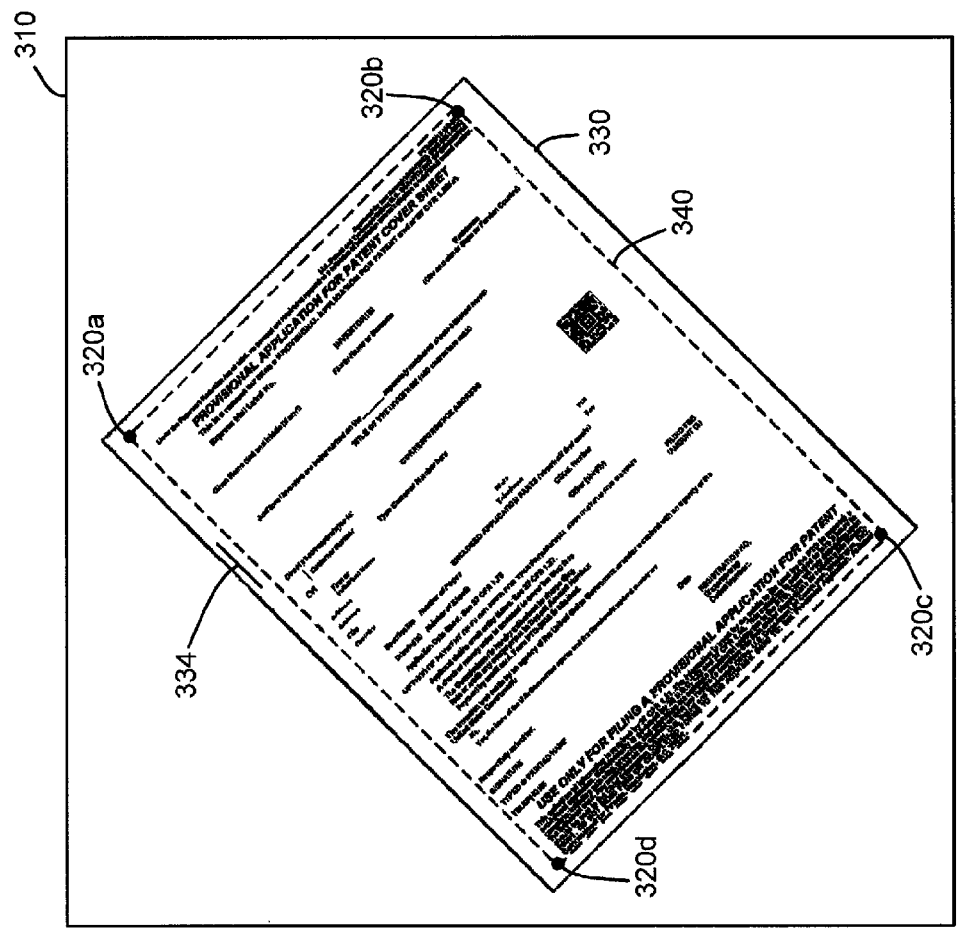
FIG. 3 is a diagram that shows an exemplary image of the form or document of FIG. 2 captured by an image reader.

Another exemplary method for finding a specific region or regions of interest inside an image 310 (e.g., document image 330) is by mapping the energy of the image. High energy areas (e.g., areas with large pixel value variation in relatively close proximity, thus representing high contrast areas) might be considered regions of interest. As shown in FIG. 3, after these high energy areas are established, a single area 340 within the image encompassing or including all of these regions of interest may be determined, and the image is cropped to that new area. Thus, regions of interest in the image data 330 within the frame 310 can have a smaller outer form edge 340 than the original, actual outer form edge 230 or from the entire image 310 taken or read 210. Corners 320a, 320b, 320c, 320d of the single encompassing area 340 can be determined first. In this manner, for example, the image data file size can be reduced and extraneous or unwanted features (e.g., feature 234, imaged feature 334) do not become part of the stored or exported image data file.

Another exemplary method for image cropping may be to search a digitized image for nominally straight edges within the image. These nominally straight edges may then be characterized in terms of length and direction. By examining a histogram of those directions a predominant orientation may be determined. All edges not nominally parallel or perpendicular to the predominate orientation may be discarded. A group or plurality of edges that comprise a form within an imager field of view may then be chosen by their proximity to the center of the image and then their proximity to other remaining edge positions. The process may then transmute a 4-sided polygon (e.g., rectangle or square) bounding those edges into a rectified image. The form or document's 230 content 340 may be considered a specific region of interest. For example, a procedure for cropping an image may be to search at least two digitized images, one image taken at full or high resolution and one taken with reduced or lower resolution to determine nominally straight edges within the image(s).

Image distortion correction process can be performed (e.g., automatically) after an image has been captured and/or cropped by the image reader 1000. In another exemplary embodiment, a position of the image reader 1000 relative to the area to be imaged can be determined (or provided) and an angular distortion (e.g., skew) may be determined and correction may then be applied. In one embodiment, the angular distortion may be determined and correction be applied to the cropped image (e.g., the four corners 320a, 320b, 320c, 320d or the image 330). For example, the image distortion correction process can adjust the single area 340 to have a prescribed shape or rectangular shape. Alternatively, the distortion caused by the mismatch of the plane of the image sensor in the image reader 1000 and the plane of the document may be corrected by processing the detected four corners of the document to the prescribed shape or rectangular shape when the document is held by the operator or the spatial relationship is unknown.

Further, an exemplary image transforming process can include other image processing to align the image 330 to the two-dimensional configuration of the frame of image data 310. In an exemplary embodiment, once the distortion corrected cropped image can be established, the image may be electronically rotated if, for example, an operator does not place a form properly square with the image reader when imaging the form. A transformation matrix may be utilized to orient the image. In one embodiment, this process can create a new image for the aligned document image (e.g., region of interest) instead of reorienting a region of interest inside the existing image.

As described herein, embodiments of an imaging system and methods for using the same can capture document images and concentrate a frame of image data to the document area. However, once the cropping, distortion correction and transforming processes are completed and produce a modified image that can represent only the document or selected regions of interest within the document, it is difficult to guarantee or even determine the orientation of the document 230 (e.g., the imaged document 330) in the modified image. In the related art, the modified image can be displayed to a user on a screen, and have the user identify the orientation so the image (e.g., the modified image) is saved correctly. However, exemplary embodiments of direct or automatic systems and/ or methods for orienting the document image, frame of image data or modified image are described herein.

Embodiments of imaging readers or imaging systems, according to the application, can read bar codes from the document image 330 or modified document image and the orientation of the decoded bar code can be used to determine the orientation of the document 230. For example, by using preloaded knowledge about the documents that are being used, or if no pre-loaded information is available, making an assumption about the bar code orientation relative to the document itself, the orientation of the decoded bar code can be used to determine the orientation of the document. Embodiments according to the application can orient the image of the document itself so that the image of the document is saved and or displayed correctly regardless of how the document was presented to the document capture system.

An embodiment of a method of processing a document image according to the application will now be described. The method embodiment shown in FIG. 4, can be implemented in and will be described using a document capture system embodiment shown in FIG. 1, however, the method embodiment of FIG. 4 is not intended to be limited thereby.

Figure 4:
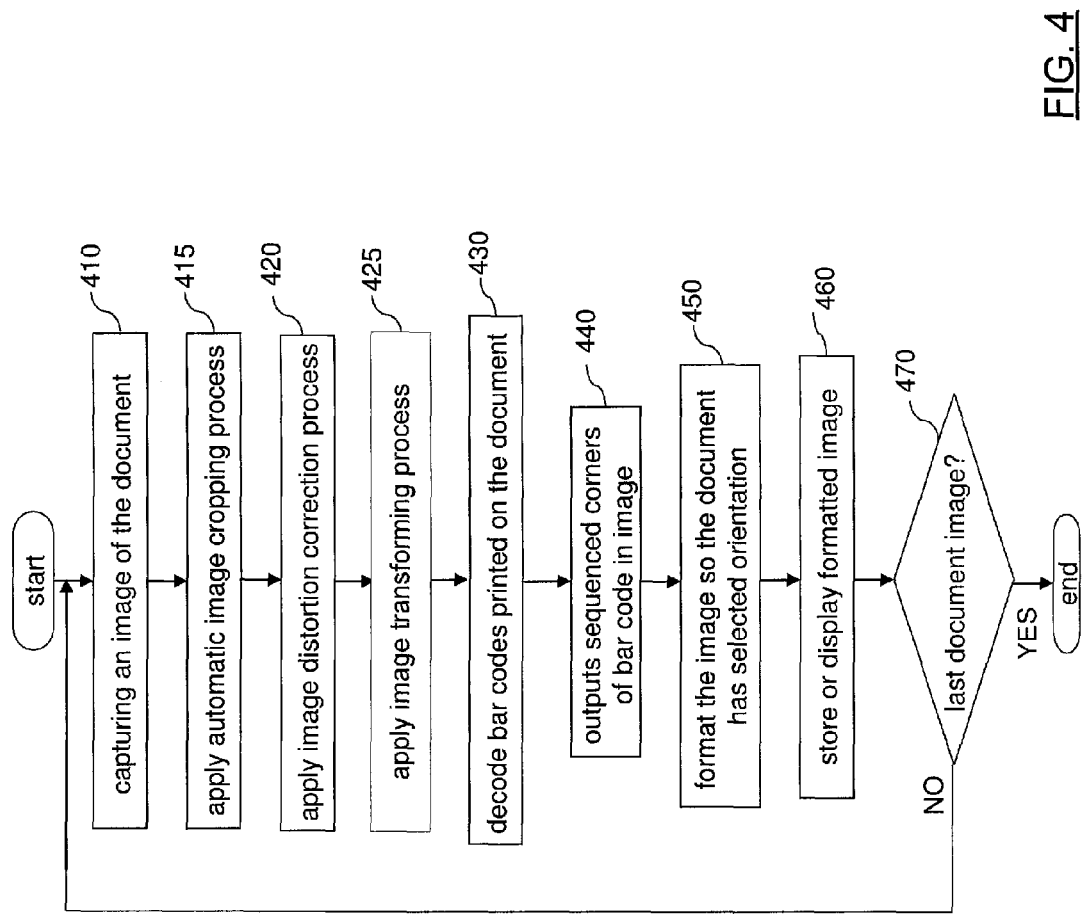
FIG. 4 is a flowchart that shows an exemplary method to process an image according to an embodiment of the application.
Figure 5:
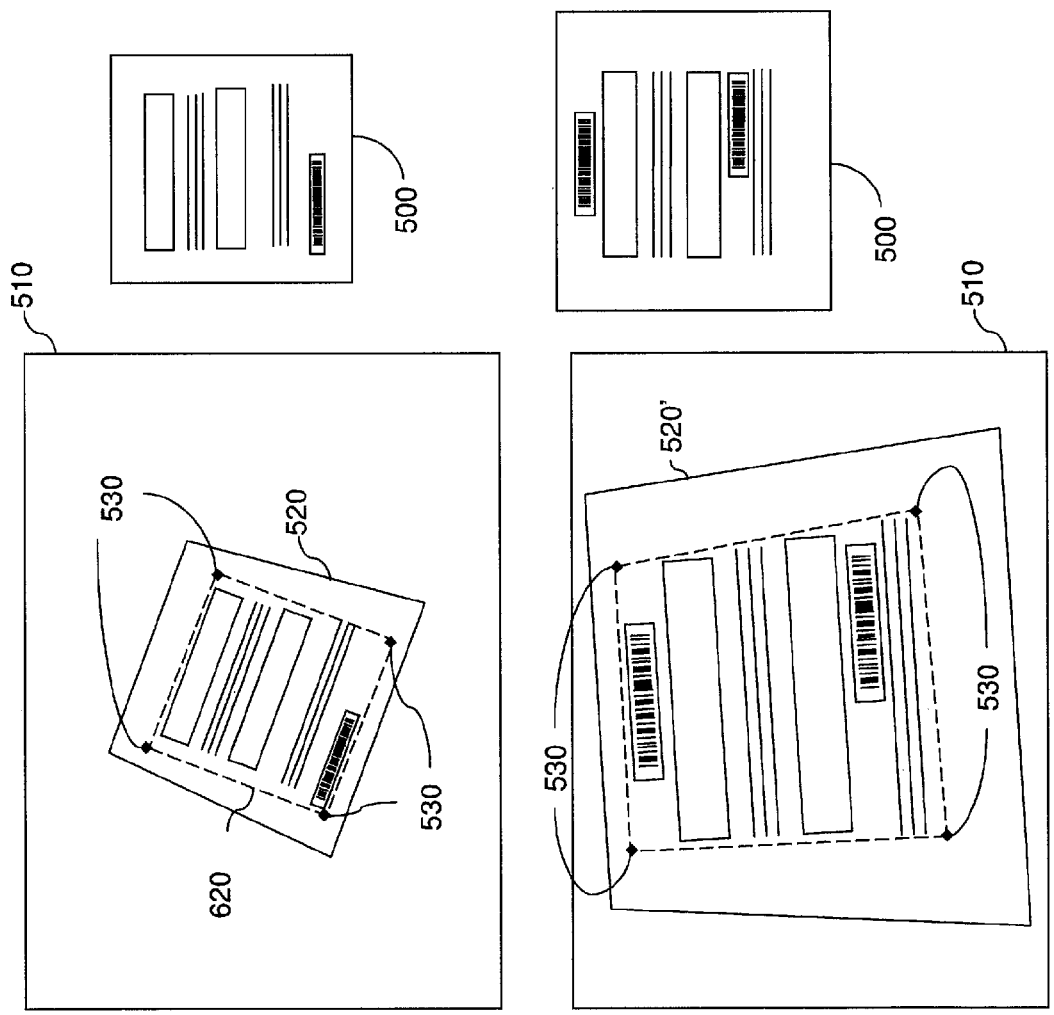
FIG. 5 is a diagram that shows an exemplary frame of image data including images of a document or form.

As shown in FIG. 4, after a process starts, an imaging system, or the image reader 1000 can be operated on a document 500 to capture an image 510 including an image of a document 520, 520' (operation block 410). As shown in FIG. 5, the captured image of the document 520, 520' can be misaligned, distorted, and occupy only a portion of the image 510 (e.g., frame of image data). Misalignment of image 520 of the document within the image 510 can mean that the image 520 of the document is not aligned with rows or columns of the pixels included in the image 510.

Then, a cropping algorithm or application can be applied by the image reader 1000, or the imaging system to determine corner points 530 of the regions of interest (e.g., document contents, text, etc.) within the image of the document 520, 520' in the image 510 (operation block 415). In one embodiment, the four corners can be determined using a cropping module in the image reader 1000. For example, the cropping module can be controlled or monitored by the CPU 1060 in FIG. 8. In one embodiment, portion of the image 510 identified by the corners 530 or the output of the cropping module is further processed for distortion (operation block 420). Such distortion can include but not be limited to distortion (e.g., skew), caused by the orientation of the imaging reader 1000 to the document.

Then, a transforming correction can be performed to align a two-dimensional representation of data in the image of the document 520, 520' to the two-dimensional layout of the frame of image data 510 (operation block 425). In one embodiment, layout of the contents of the image of the document or form 520 (e.g., text or features) can be used to perform the transforming alignment process. Alternatively, information provided by the cropping process can be used (e.g., corner points 530). Further, a size adjustment can be performed. Resizing the image 520 of a document can be performed by a cropping module or a transforming correction module without loss of generality. In one embodiment, the transforming correction can create a new transformed image from an image that has been cropped.

Figure 6:
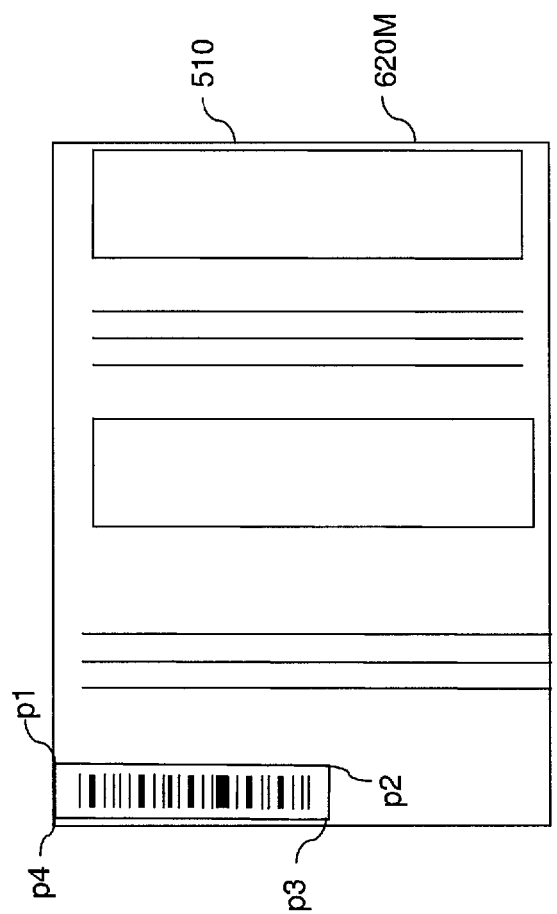
FIG. 6 is a diagram that shows an exemplary modified image from a form or document in a frame of image data.

An exemplary resulting modified image 620M of the document is shown in FIG. 6. The resulting modified image 620M can be used for further processing or the cropped image 530 in the image 510 including the document.

The image reader 1000 can process image 520, 620 or the modified image 620M to decode one or more bar codes that are printed on the document (operation block 430). In one embodiment, the image reader can scan entire area of the modified image 620M to detect the bar code.

The image reader 1000 can output an orientation of the detected barcode found in the image 520, 620 or the modified image 620M (operation block 440). The image reader 1000 can output a position of the bar code in the cropped image 620. In one embodiment, the image reader 1000 outputs the corners of the position of the bar code in the cropped image 620 or the modified image 620M, and the sequenced order of the corners can represent the orientation of the bar code. For example, the image reader 1000 can output $P_1$ $(X_a, Y_a)$, $P_2$ $(X_b, Y_b)$, $P_3$ $(X_c, Y_c)$, $P_4$ $(X_d, Y_d)$, where $P_1$-$P_4$ represent clockwise order of corners of the barcode. Alternatively, the image reader 1000 can read the barcode to determine the orientation of the detected barcode and output or store an indication of the detected barcode orientation.

Using the orientation information of the barcode, the image reader 1000 (e.g., CPU 1060) can format the cropped image 620 or the modified image 620M as desired or preselected for transmission, storing or displaying (operation block 450). For example, typically, the desired orientation of the image in the document or the cropped image is with the writing set to be read right-to-left and top-to-bottom. However, other orientations of the bar code to the document image can be used. Accordingly, in one embodiment, the orientation of the decoded barcode can match the orientation of the document.

Figure 7:
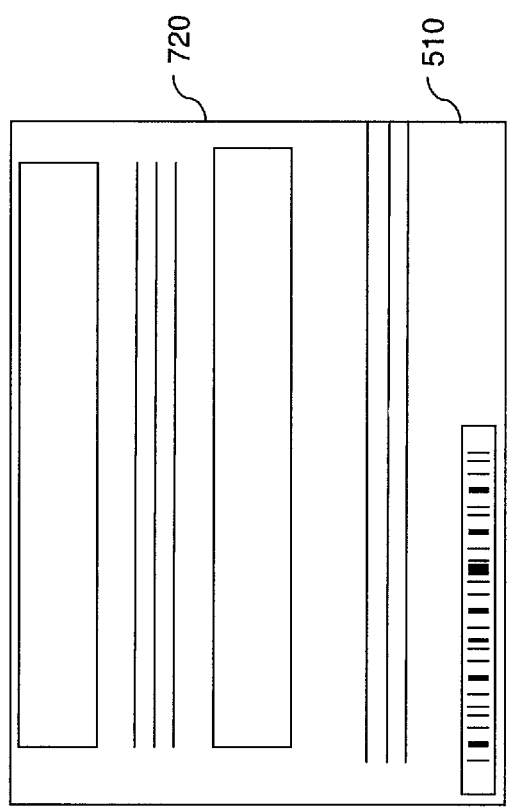
FIG. 7 is a diagram that shows an exemplary oriented modified image of a form.
Figure 8:
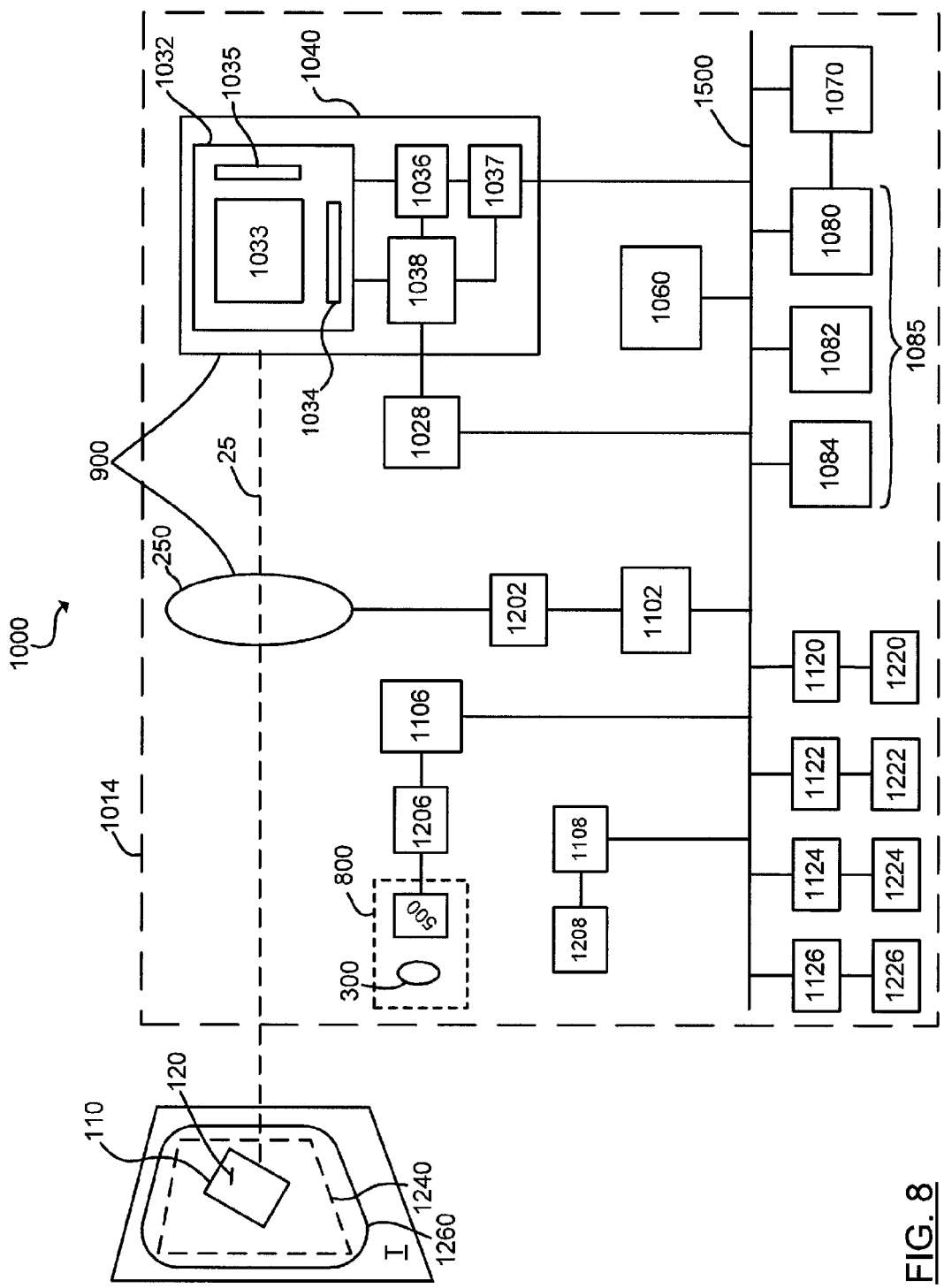
FIG. 8 is a block diagram illustrating an imaging terminal in one embodiment.

As shown in FIG. 7, the formatted modified image 720 in the proper orientation can be stored or displayed to a user by image reader 1000 or the CPU 1060 from FIG. 8 (operation block 460). Alternatively, the cropped image 620 can be stored or transmitted with an indication of its formatted orientation 720. The formatted cropped image, (e.g., where the top of the image represents the top of the document) can be processed in the proper orientation. Next, the determination can be made whether the processed image is the last document image to process (operation block 470). When the determination in operation block 470 is negative, control can return to operation block 410). When the determination in operation block 470 is affirmative, the process can end.

Using the optionally preloaded information about the orientation of the bar code relative to the orientation of the document, the orientation of the document can be established. In one embodiment, a one or more relationships between the barcode and a document type in which the barcode is printed can be provided in advance to the image reading terminal 1000. For example, such relationships can be stored in memory. Exemplary relationships can provide a relationship between the orientation of the printed barcode and a preferred viewing orientation and orientation type of the document type. Thus, the desired layout of the formatted cropped image 720 could have a portrait print orientation or a landscape print orientation. In one embodiment, the orientation could be set for top-to-bottom left-to-right viewing and a landscape (instead of portrait) where the orientation of the printed barcode matches the orientation of the document. Alternatively, the orientation of the document could ±45°, ±90°, or 180° opposite from the printed barcode orientation. When multiple bar codes are printed in a document, the document can be aligned with a specific one of the multiple bar codes (e.g., a 1D bar code, or a master bar code), a subset of the multiple barcodes (e.g., all 2D barcodes), or all of the multiple bar codes. In one embodiment, the formatted image alignment can vary using the multiple bar codes (e.g., different orientations or alignment at different times in a shipping process) such as when control of the document is changing between transport companies. In one embodiment, the orientation of the printed barcode is assumed to match the orientation of the document.

In one embodiment, the bar code detection or reading is performed by the imaging terminal 1000 (e.g., operation blocks 430-440) and the image processing (e.g., operation blocks 410-425) can be separately performed by the local or remote server 2000, 3000 (e.g., concurrently). Upon completion, the combined information can be used by the imaging terminal to process the image of the document in the image frame.

In another aspect, system 5000 can include pre-stored information respecting document 110 where document is of a predetermined type. Exemplary pre-stored information of a document can include document dimensions, text block offset and dimensions and bar code symbol offset and dimensions. The pre-stored information respecting a document can include the dimensions of a known document type, information respecting number of bar codes or text strings, and the dimensions and offset of a text box. The pre-stored information can be determined manually or automatically by examination of captured frames of image data. A system in which pre-stored information can be used to process documents is described in co-pending U.S. patent application Ser. No. 12/751,560, incorporated herein by reference. In this aspect, the bar code can be located in the image of the document faster. Additional method and apparatus elements are described in U.S. application Ser. No. 12/751,430 filed on the filing date of the present application. U.S. application Ser. No. 12/751,430 is incorporated herein by reference.

An exemplary hardware platform for support of operations described herein with reference to an image sensor based indicia reading terminal is shown and described with reference to FIG. 8.

Indicia reading terminal 1000 can include an image sensor 1032 comprising a multiple pixel image sensor array 1033 having pixels arranged in rows and columns of pixels, associated column circuitry 1034 and row circuitry 1035. Associated with the image sensor 1032 can be amplifier circuitry 1036 (amplifier), and an analog to digital converter 1037 which converts image information in the form of analog signals read out of image sensor array 1033 into image information in the form of digital signals. Image sensor 1032 can also have an associated timing and control circuit 1038 for use in controlling e.g., the exposure period of image sensor 1032, gain applied to the amplifier 1036. The noted circuit components 1032, 1036, 1037, and 1038 can be packaged into a common image sensor integrated circuit 1040. Image sensor integrated circuit 1040 can incorporate fewer than the noted number of components. In one example, image sensor integrated circuit 1040 can be provided e.g., by an MT9V022 (752×480 pixel array) or an MT9V023 (752×480 pixel array) image sensor integrated circuit available from Micron Technology, Inc. In one example, image sensor integrated circuit 1040 can incorporate a Bayer pattern filter for a subset of pixels, so that defined at the image sensor array are red pixels at red pixel positions, green pixels at green pixel positions, and blue pixels at blue pixel positions. Frames that are provided utilizing such an image sensor array incorporating mono-color image patterns, the pattern can include a Bayer pattern can include red pixel values at red pixel positions, green pixel values at green pixel positions, and blue pixel values at blue pixel positions and monochrome pixel values at remaining positions. In an embodiment incorporating mono-color image pattern image sensor array, CPU 1060 prior to subjecting a frame to further processing can interpolate pixel values at frame pixel positions intermediate of green pixel positions utilizing green pixel values for development of a monochrome frame of image data. Alternatively, CPU 1060 prior to subjecting a frame for further processing can interpolate pixel values intermediate of red (blue) pixel positions utilizing red (blue) pixel values for development of a monochrome frame of image data. CPU 1060 can alternatively prior to subjecting a frame for further processing can interpolate pixel values intermediate of monochrome pixel positions utilizing monochrome pixel values.

In the course of operation of terminal 1000, image signals can be read out of image sensor 1032, converted, and stored into a system memory such as RAM 1080. A memory 1085 of terminal 1000 can include RAM 1080, a nonvolatile memory such as EPROM 1082 and a storage memory device 1084 such as may be provided by a flash memory or a hard drive memory. In one embodiment, terminal 1000 can include CPU 1060 which can be adapted to read out image data stored in memory 1080 and subject such image data to various image processing algorithms. Terminal 1000 can include a direct memory access unit (DMA) 1070 for routing image information read out from image sensor 1032 that has been subject to conversion to RAM 1080. In another embodiment, terminal 1000 can employ a system bus providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor 1032 and RAM 1080 are within the scope and the spirit of the invention.

Regarding server 2000 and server 3000, each of server 2000 and server 3000, in the manner of terminal 1000 can include a CPU 1060 and memory 1085 coupled via system bus 1500. A memory of system 5000 in one embodiment can include the memories 1085 each of terminal 1000, server 2000 and server 3000.

Referring to further aspects of terminal 1000, lens assembly 200 can be adapted for focusing an image of a document 110 located within a field of view 1240 on a substrate, T, onto image sensor array 1033. A size in target space of a field of view 1240 of terminal 1000 can be varied in a number of alternative ways. A size in target space of a field of view 1240 can be varied e.g. by changing a terminal to target distances, changing an imaging lens setting, changing a number of pixels of image sensor array 1033 that are subject to read out. Imaging light rays can be transmitted about imaging axis 25. Lens assembly 200 can be adapted to be capable of multiple focal lengths and multiple planes of optical focus (best focus distances).

Terminal 1000 can include an illumination subsystem 800 for illumination of target, T, and projection of an illumination pattern 1260. Terminal can also be devoid of illumination sub-system 800. Illumination pattern 1260, in the embodiment shown can be projected to be proximate to but larger than an area defined by field of view 1240, but can also be projected in an area smaller than an area defined by a field of view 1240.

In one embodiment, illumination subsystem 800 can also include an illumination lens assembly 300. In addition to or in place of illumination lens assembly 300 illumination subsystem 800 can include alternative light shaping optics, e.g. one or more diffusers, mirrors and prisms. In use, terminal 1000 can be oriented by an operator with respect to a target, T, (e.g., a document, a package, another type of substrate) bearing decodable indicia 120 in such manner that illumination pattern 1260 is projected on a decodable indicia 120. In the example of FIG. 8, decodable indicia 120 is provided by a document that bears a 1D bar code symbol 120. Decodable indicia 120 could also be provided by a 2D bar code symbol or optical character recognition (OCR) characters. Referring to further aspects of terminal 1000, lens assembly 200 can be controlled with use of electrical power input unit 1202 which provides energy for changing a plane of optimum focus of lens assembly 200. In one embodiment, an electrical power input unit 1202 can operate as a controlled voltage source, and in another embodiment, as a controlled current source. Illumination subsystem light source assembly 500 can be controlled with use of light source control circuit 1206. Electrical power input unit 1202 can apply signals for changing optical characteristics of lens assembly 200, e.g., for changing a focal length and/or a best focus distance of (a plane of optimum focus of) lens assembly 200. Light source control circuit 1206 can send signals to illumination pattern light source assembly 500, e.g., for changing a level of illumination output by illumination pattern light source assembly 500. Certain elements of terminal 1000, e.g., image sensor integrated circuit 1040 (and accordingly array 1033), imaging lens 200 and illumination subsystem 800 can be packaged into an imaging module 400 which can be incorporated into hand held housing 1014.

Terminal 1000 can also include a number of peripheral devices including trigger 1220 which may be used to make active a trigger signal for activating frame readout and/or certain decoding processes. Terminal 1000 can be adapted so that activation of trigger 1220 activates a trigger signal and initiates a decode attempt. Specifically, terminal 1000 can be operative so that in response to activation of a trigger signal, a succession of frames can be captured by way of read out of image information from image sensor array 1033 (typically in the form of analog signals) and then storage of the image information after conversion into memory 1080 (which can buffer one or more of the succession of frames at a given time). CPU 1060 can be operational to subject one or more of the succession of frames to a decode attempt.

For attempting to decode a bar code symbol, e.g., a one dimensional bar code symbol, CPU 1060 can process image data of a frame corresponding to a line of pixel positions (e.g., a row, a column, or a diagonal set of pixel positions) to determine a spatial pattern of dark and light cells and can convert each light and dark cell pattern determined into a character or character string via table lookup. Where a decodable indicia representation is a 2D bar code symbology, a decode attempt can comprise the steps of locating a finder pattern using a feature detection algorithm, locating matrix lines intersecting the finder pattern according to a predetermined relationship with the finder pattern, determining a pattern of dark and light cells along the matrix lines, and converting each light pattern into a character or character string via table lookup.

Terminal 1000 can include various interface circuits for coupling various of the peripheral devices to system address/data bus (system bus) 1500, for communication with CPU 1060 also coupled to system bus 1500. Terminal 1000 can include interface circuit 1028 for coupling image sensor timing and control circuit 1038 to system bus 1500, interface circuit 1102 for coupling electrical power input unit 1202 to system bus 1500, interface circuit 1106 for coupling illumination light source bank control circuit 1206 to system bus 1500, and interface circuit 1120 for coupling trigger 1220 to system bus 1500. Terminal 1000 can also include a display 1222 coupled to system bus 1500 and in communication with CPU 1060, via interface 1122, as well as pointer mechanism 1224 in communication with CPU 1060 via interface 1124 connected to system bus 1500. Terminal 100 can also include keyboard 1226 coupled to system bus 1500. Keyboard 1226 can be in communication with CPU 1060 via interface 1126 connected to system bus 1500. Terminal 1000 can also include range detector unit 1208 coupled to system bus 1500 via interface 1108.

A succession of frames of image data that can be captured and subject to the described processing can be full frames (including pixel values corresponding to each pixel of image sensor array 1033 or a maximum number of pixels read out from array 1033 during operation of terminal 1000). A succession of frames of image data that can be captured and subject to the described processing can also be "windowed frames" comprising pixel values corresponding to less than a full frame of pixels of image sensor array 1033. A succession of frames of image data that can be captured and subject to the described processing can also comprise a combination of full frames and windowed frames. A full frame can be captured by selectively addressing for read out pixels of image sensor 1032 having image sensor array 1033 corresponding to the full frame. A windowed frame can be captured by selectively addressing for read out pixels of image sensor 1032 having image sensor array 1033 corresponding to the windowed frame. In one embodiment, a number of pixels subject to addressing and read out determine a picture size of a frame. Accordingly, a full frame can be regarded as having a first relatively larger picture size and a windowed frame can be regarded as having a relatively smaller picture size relative to a picture size of a full frame. A picture size of a windowed frame can vary depending on the number of pixels subject to addressing and readout for capture of a windowed frame.

Terminal 1000 can capture frames of image data at a rate known as a frame rate. A typical frame rate is 60 frames per second (FPS) which translates to a frame time (frame period) of 16.6 ms. Another typical frame rate is 30 frames per second (FPS) which translates to a frame time (frame period) of 33.3 ms per frame. A frame rate of terminal 1000 can be increased (and frame time decreased) by decreasing of a frame picture size.

Figure 9:
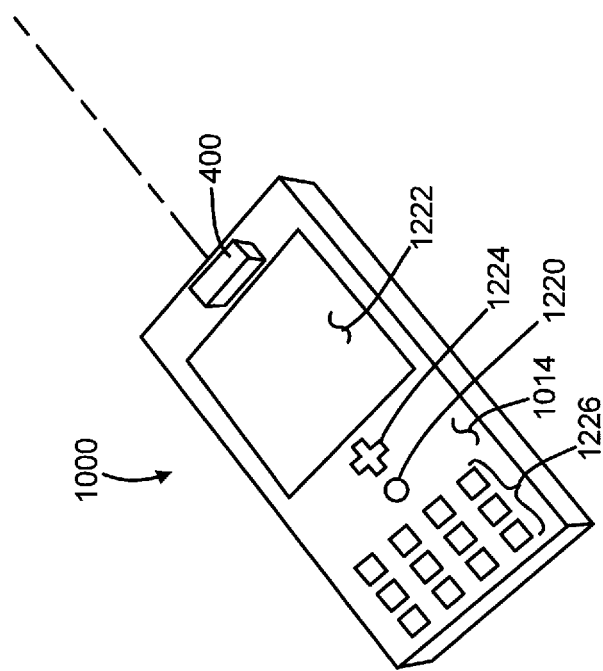
FIG. 9 is a perspective physical form view of an exemplary imaging terminal including a hand held housing.

A physical form view of terminal 1000 in one embodiment is shown in FIG. 9. Trigger 1220, display 1222, pointer mechanism 1224, and keyboard 1226 can be disposed on a common side of a hand held housing 1014 as shown in FIG. 9. Display 1222, pointer mechanism 1224, and keyboard 1226 in one embodiment can be regarded as a user interface of terminal 1000. Display 1222 in one embodiment can incorporate a touch panel for navigation and virtual actuator selection in which case a user interface of terminal 1000 can be provided by display 1222. A user interface of terminal 1000 can also be provided by configuring terminal 1000 to be operative to be reprogrammed by decoding of programming bar code symbols. A hand held housing 1014 for terminal 1000 can in another embodiment be devoid of a display and can be in a gun style form factor.

The image processing steps described herein can be distributed between terminal 1000, servers 2000 and 3000, and one embodiment can be executed entirely by terminal 1000. In such an embodiment, system 5000 can be regarded as being provided by terminal 1000.

Although one or more exemplary embodiments were described using a hand held indicia reading terminal and methods for same, the application is not intended to be limited thereto. For example, terminals can include but are not limited to terminals including fixed bar code readers, bi-optic bar code readers and any related type terminals using a plurality of pixels in an image sensor.

An exemplary function of the image reader may be to decode machine readable symbology provided within the target or captured image. One dimensional symbologies may include very large to ultra-small, Code 128, Interleaved 2 of 5, Codabar, Code 93, Code 11, Code 39, UPC, EAN, and MSI, or other linear symbology. Stacked 1D symbologies may include PDF, Code 16K and Code 49, or other stacked 1D symbology. 2D symbologies may include Aztec, Datamatrix, Maxicode, and QR-code, or other 2D symbology. UPC/EAN bar codes are standardly used to mark retail products throughout North America, Europe and several other countries throughout the worlds. Decoding is a term used to describe the interpretation of a machine readable code contained in an image projected on the image sensor 1032. The code has data or information encoded therein. Information respecting various reference decode algorithm is available from various published standards, such as by the International Standards Organization ("ISO").

Many functions of electrical and electronic apparatus may be implemented in hardware (for example, hard-wired logic), in software (for example, logic encoded in a program operating on a general purpose processor), and in firmware (for example, logic encoded in a non-volatile memory that is invoked for operation on a processor as required). Substitution of one implementation of hardware, firmware and software for another implementation of the equivalent functionality using a different one of hardware, firmware and software may be considered. To the extent that an implementation may be represented mathematically by a transfer function, that is, a specified response is generated at an output terminal for a specific excitation applied to an input terminal of a "black box" exhibiting the transfer function, any implementation of the transfer function, including any combination of hardware, firmware and software implementations of portions or segments of the transfer function may be considered.

Embodiments of orienting forms or documents images in frames of image data, according to the application were described using a barcode orientation. Embodiments are not intended to be so limited; for example, an information bearing indicia (IBI) or dataform can be used. An IBI or dataform may be an originally machine generated symbology that is also machine readable, such as a 1D barcode, a 2D barcode, a 1D stacked barcode, a logo, glyphs, color-codes, and the like.

Embodiments of orienting forms or documents images in frames of image data were described using locations or offset of positions in image processing, however, embodiments are not intended to be so limited as percentages, or relative location can be determined for features (e.g., bar codes) in documents. Embodiments of orienting forms or documents images in frames of image data, according to the application were described using distortion processing, however, additional optical correction processing may be used on the image taken for different effects, such as flattening of the image (e.g., adjusting to make the dark/light contrast uniform across the cropped image or optical component correction, (e.g., lens barrel correction)).

Although embodiments were described with a single lens system embodiments of the application are not intended to be so limited. For example, two or more lens systems can be used or one lens system can be modified to expose two or more regions of an image sensor.

A small sample of systems methods and apparatus that are described herein is as follows:

A. An image reading terminal comprising:

a two dimensional image sensor array extending along an image plane, said two dimensional image sensor array comprising a plurality of pixels;

an optical assembly for use in focusing imaging light rays onto the plurality of pixels of said two dimensional image sensor array;

a housing encapsulating said two dimensional image sensor array and said optical assembly;

wherein the terminal is operative in an indicia decode mode in which the terminal, in response to an operator initiated command, captures a frame of image data and processes the frame of image data for attempting to decode a decodable indicia representation;

wherein the terminal is operative in a picture taking mode in which the terminal, in response to an operator initiated command, captures at least one frame of image data for attempting to output an image;

a memory capable of storing said frame of image data; and a control processor capable of cropping a received document image to a prescribed size in pixels or linear dimensions, and said control processor capable of storing or displaying the received document image or the cropped document image in a prescribed orientation responsive to an orientation of a barcode in the received document image.

B. An indicia reading terminal method for processing a document image, comprising:

receiving a document image disposed in a frame of image data;

cropping the document image to a region of interest detected in the document image;

correcting the document image for a spatial relationship between a document and the indicia reading terminal;

aligning a two dimensional orientation of the document image to the two dimensional orientation of the frame of image data;

determining an orientation of a barcode in a modified document image;

storing or displaying the document image or the cropped document image in a prescribed viewing position responsive to an orientation of the barcode in the document image.

C. A method of processing data from an indicia reading terminal including an image sensor array comprising a plurality of pixels, the method comprising:

capturing an image of the document automatically cropping the image of the document to determine corner points of the document;

decoding one or more bar codes printed on the document, where the decoding provides sequenced corners of a position of the bar code in the image of the document, and where the sequenced corners represents an orientation of the bar code in the image of the document;

determining an orientation of the document according to the orientation of the bar code;

formatting the image of the document so that a top of the image of the document represents a top of the document in a proper orientation; and displaying or saving the formatted image of the document.

While the present application has been described with reference to a number of specific embodiments, it will be understood that the true spirit and scope of the application should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been set forth, it will be understood that features and aspects that have been described with reference to each particular embodiment can be used with each remaining particularly set forth embodiment. For example, features or aspects described using FIG. 4 can be applied to embodiments described using FIG. 1.

We claim:

1. An indicia reading terminal method for processing a document image, comprising:

receiving a document image disposed in a frame of image data, wherein a portion of the document image is occupied by a barcode;

cropping the document image to a region of interest detected in the document image so that a resulting cropped document image includes the barcode and additional data;

correcting the cropped document image for a spatial relationship between a document and the indicia reading terminal, resulting in a corrected document image;

aligning a two dimensional orientation of the corrected document image to the two dimensional orientation of the flame of image data, resulting in an aligned document image;

decoding the barcode to determine sequenced corners of a position of the barcode within the aligned document image, where the sequenced corners represent an orientation of the barcode in the aligned document image;

determining an orientation of the barcode within the aligned document image;

storing or displaying the aligned document image in a prescribed viewing position responsive to an orientation of the barcode in the aligned document image.

2. The indicia reading terminal method of claim 1, where the cropping the document image comprises:

determining four corners of the document image; and translating the identified two dimensional area of the document image to the two dimensional area of a prescribed size.

3. The indicia reading terminal method of claim 1, comprising:

identifying the barcode in the cropped document image; and determining a first or second orientation of the identified barcode;

where a prescribed orientation is of the document image or the cropped document image is to match the first orientation of the barcode.

4. The indicia reading terminal method of claim 3, where the prescribed orientation of the document or document image is configured to provide a topdown, left-to-right visual representation of material in the document image or the cropped document image.

5. The indicia reading terminal method of claim 1, where a prescribed orientation of the document image or the cropped document image is the first orientation of the barcode rotated by 90° clockwise or by 90° counterclockwise.

6. The indicia reading terminal method of claim 1, wherein the method includes utilizing a hand held indicia reading terminal.

7. The indicia reading terminal method of claim 1, wherein the method includes correcting for imaging system distortion caused when an imaging axis of the indicia reading terminal is non-perpendicular to a document being imaged.

8. The indicia reading terminal of claim 1, wherein the additional data includes text.

9. The indicia reading terminal of claim 1, wherein the additional data includes handwritten data.

10. The indicia reading terminal of claim 1, wherein the additional data includes a line.

11. The indicia reading terminal of claim 1, wherein the additional data includes a picture.

12. A method of processing data from an indicia reading terminal including an image sensor array comprising a plurality of pixels, the method comprising:
- capturing an image of a document, wherein a portion of the image of a document is occupied by a barcode;
- automatically cropping the captured image of the document to determine corner points of the document, wherein the cropping is performed so that a resulting cropped image of the document includes the barcode and additional data;
- correcting the cropped document image for a spatial relationship between a document and the indicia reading terminal, resulting in a corrected document image;
- aligning a two dimensional orientation of the corrected document image to the two dimensional orientation of the frame of image data, resulting in an aligned document image;
- decoding the barcode, where the decoding provides sequenced corners of a position of the barcode in the aligned image of the document, and where the sequenced corners represents an orientation of the barcode in the aligned image of the document;
- determining an orientation of the aligned image of the document according to the orientation of the bar code;
- formatting the oriented image of the document so that a top of the oriented image of the document represents a top of the document in a proper orientation; and
- displaying or saving the formatted image of the document.

13. The method of claim 12, wherein the decoding the barcode comprises sub image decoding an area identified by the corners of the cropped image of the document or image decoding the area identified by the corners of the document as a whole.

14. The method of claim 12, comprising storing a prescribed relationship of an orientation of the barcode relative to the document orientation.

15. The method of claim 12, comprising storing data for a plurality of document types, wherein a document type of the plurality of document types has a preset barcode location and a preset barcode orientation.

16. The method of claim 12 wherein the determining an orientation of the cropped image of the document according to the orientation of the barcode comprises using stored prescribed relationships, wherein the proper orientation comprises a landscape or portrait orientation.

17. The method of claim 12, comprising:
- a memory capable of storing said frame of image data,
- wherein the terminal is operative in an indicia decode mode in which the terminal, in response to an operator initiated command, captures the frame of image data and processes the frame of image data for attempting to decode a decodable indicia representation;
- wherein the terminal is operative in a picture taking mode in which the terminal, in response to an operator initiated command captures the frame of image data and processes the frame of image data for attempting to output an image or color image data.

18. The method of claim 12, wherein the method includes utilizing a hand held indicia reading terminal.

19. The method of claim 12, wherein the method includes correcting for imaging system distortion caused when an imaging axis of the indicia reading terminal is non-perpendicular to a document being imaged.

20. The method of claim 12, wherein the additional data includes text.

21. The method of claim 12, wherein the additional data includes handwritten data.

22. The method of claim 12, wherein the additional data includes a second barcode.

* * * * *